United States Patent [19]
Ford et al.

[11] Patent Number: 5,625,688
[45] Date of Patent: Apr. 29, 1997

[54] SHOWER TELEPHONE

[75] Inventors: Joseph E. Ford, Cary; Donald N. Jursich, Chicago, both of Ill.; Raymond Chan, Vancouver, Canada

[73] Assignee: Jing Mei Industrial Holdings, Ltd., Cook Islands

[21] Appl. No.: 490,786

[22] Filed: Jun. 15, 1995

[51] Int. Cl.⁶ .................................................. H04M 1/00
[52] U.S. Cl. ........................................... 379/433; 379/434
[58] Field of Search ..................................... 379/433, 434, 379/428, 429, 420, 436, 58–63

[56] References Cited

U.S. PATENT DOCUMENTS

| | | | |
|---|---|---|---|
| D. 317,452 | 6/1991 | Garab | D14/250 |
| D. 321,885 | 11/1991 | Sheldrake | D14/253 |
| 2,453,192 | 11/1948 | Bryant | 179/179 |
| 2,538,419 | 1/1951 | Huston et al. | 179/156 |
| 3,962,555 | 6/1976 | Efaw | 179/185 |
| 4,071,040 | 1/1978 | Moriarty | 137/199 |
| 4,920,564 | 4/1990 | Allkins | 379/437 |
| 4,930,157 | 5/1990 | Citron et al. | 379/433 |
| 5,025,921 | 6/1991 | Gasparaitis et al. | 206/320 |
| 5,220,598 | 6/1993 | Bock | 379/110 |
| 5,297,203 | 3/1994 | Rose et al. | 379/62 |
| 5,329,650 | 7/1994 | Zaccai et al. | 4/605 |

FOREIGN PATENT DOCUMENTS 6268548  9/1994  Japan .................................... 379/428

*Primary Examiner*—Jack K. Chiang
*Attorney, Agent, or Firm*—Thomas W. Tolpin

[57] ABSTRACT

A safe cordless telephone is provided for use in showers. The user-friendly cordless telephone can also be used when taking a bath or outside when it is raining. The dependable cordless comprises a special portable cordless handset with a water-resistant housing that provides a handset body. The handset body is made of an impact-resistant plastic capable of withstanding water pressure and is insulated to prevent electrical shock. A water-resistant antenna extends upwardly from the handset. A battery seal is positioned about the battery chamber to prevent water from entering into the battery chamber. An elastomeric rib is snugly positioned about the front and back of the handset to prevent water from entering into the interior of the handset and shorting the telephone circuitry. The earpiece and mouthpiece of the handset can also have water impermeable membranes to prevent water from passing into the earpiece and mouthpiece of the handset. The back of the handset can have discs or segments to enhance gripping of the handset and prevent slippage of the handset in a shower. The front of the handset can also have a thumb-engaging depression to facilitate gripping of the handset in a shower. The base unit is located away from the shower and has a base antenna and a battery charger, as well as other features.

10 Claims, 1 Drawing Sheet

SHOWER TELEPHONE

BACKGROUND OF THE INVENTION

This invention pertains to telephones and, more particularly, to portable telephones for use in showers.

Cordless telephones utilize radio transmission between a portable cordless handset and a base unit which is connected (hard wired) to a telephone line to provide direct-dial telephone service to phones to others in homes, offices, vehicles and other locations. Conventional base units provide a stand and cradle to store and charge the handset when the handset is not in use. Some base units hold the handset in a vertical position. Other base units hold the handset face down in a horizontal position. The purpose of the base unit is to transmit the telephone calls over the telephone line and to cradle and charge the handset when the handset is not in used. Some base units have a light to indicate when it is charging the batteries in the handset.

A conventional cordless handset has alpha numeric push-buttons for dialing a telephone number in a manner similar to a stationary telephone. The handset may also have a flash button or base-to-handset paging button to indicate an incoming telephone call. The incoming telephone call is received and heard by the user when the flash, paging or receive button on the handset is depressed. Some handsets are automatically connected to the base without depressing a flash, paging or receive button. Typically, there are no alpha numeric push-buttons on the base unit since dialing is done from the handset.

Both the cordless handset and its base unit have an antenna. Since there are no telephone lines which connect the cordless handset to its base unit, both speech and signaling are transmitted by radio waves between the antenna of the handset and the antenna of the base unit. The cordless telephone transmits at a low power. The base unit transmits at a higher power.

Radio transmission can be accomplished between the cordless telephone and the base unit through the use of special tones rather than applying a voltage level or detecting a current as is done in overhead telephone lines. The tones will ring the cordless telephone to indicate an incoming call or will indicate a busy signal. The user of a cordless handset hears a normal dial tone when beginning to make an outgoing call and can continue dialing, i.e. pressing the alpha/numeric buttons, in the same manner as a stationary telephone with overhead telephone lines.

The cordless telephone handset can tune to frequency modulated (FM) channels assigned to the cordless telephones, such as in the 800–900 MHz range. Some cordless telephones can operate from 25–150 feet away from their base units. Other cordless telephones can operate as much as 300–600 feet away from their base unit.

Cordless telephone handsets can operate on a single channel or multiple channels, e.g. 7–100 channels. Each cordless telephone handset can have a small integrated circuit or chip providing a numeric assignment module (NAM). The NAM chip is programmed usually by the telephone dealer or installer to contain the information that uniquely identifies the cordless telephone with its base unit. The information programmed in the NAM chip includes the telephone number and serial number of the cordless telephone.

An antenna is a length of wire that radiates or captures radio signals. Without an antenna, the cordless handset would be virtually useless since the telephone would have no means to transmit and receive signals to and from its base unit. Because of the microwave frequencies utilized in cellular telephones, it is possible to make the cordless telephone antennas quite small. Cordless telephone antennas come in many shapes and sizes. Generally the antenna radiates an omnidirectional signal, i.e. one that radiates outwardly in all directions from the antenna.

Conventional cordless telephones must be used in dry places inside a house, office, etc. They can also be used outside on a sunny or dry day, provided they are within close range of its base unit. Rain, moisture or water will short out cordless telephones and may present an electrical hazard and serious danger to the user that may cause electrical shock or even electrocution to the user. Manufacturers, suppliers and distributors of cordless telephone usually warn their customers in an accompanying instruction booklet not to submerge the cordless telephone or use the cordless telephone in showers, bathtubs, rain, or excess moisture or humidity.

Many people receive telephone calls when taking showers or in a bathtub. This is very inconvenient, since the person in the shower or bath to receive the telephone call has to get out of the shower or bath, put a towel or robe over their dripping wet body and run to the telephone. Sometimes they get to the telephone after it stops ringing which is too late to receive the call. Other times the person in the shower or bath do not hear the telephone call. This can be very frustrating.

It is, therefore, desirable to develop an improved cordless telephone system for use in showers, which overcomes most, if not all, of the preceding problems.

SUMMARY OF THE INVENTION

An improved cordless telephone is provided for use in showers. The safe, user-friendly cordless telephone can also be used when taking a bath or outside when it is drizzling or raining or outside on damp days or when there is high humidity. The novel cordless telephone system is attractive, convenient, economical, reliable and effective.

The shower telephone preferably comprises a special portable cordless handset with a water-impervious (water-resistant/waterproof) housing that provides a handset body. The handset can have a front section with a mouthpiece and earpiece and a manually gripable back section. The housing can have a hollow interior cavity or compartment to house electrical receiving and transmitting circuitry which is connected to the earpiece and mouthpiece, respectively, to facilitate receiving and transmission of telephone calls. Significantly, the housing comprises a water-impervious barrier for preventing water from entering into the interior cavity or compartment of the housing and shorting/shunting the telephone circuitry. Advantageously, the handset body is made of an impact-resistant electrically insulating material capable of withstanding water pressure from a shower and is grounded, insulated, and electrically non-conductive to prevent electrical shock and electrocution. A water-impervious antenna can extend upwardly from the handset.

In the preferred form, the handset housing has a battery chamber to receive a battery pack comprising at least one battery, and typically, a set of batteries, to power the handset. A water impermeable seal is positioned about the battery chamber to prevent water from entering into the battery chamber and shorting the batteries in the battery pack. Preferably, the handset has an indicator light, such as an light emitting diode (LED), to signal when the power from the battery pack is low.

Fluid sealing means, such as a water impermeable gasket or seal, is mounted between and seals the front and back sections of the handset body to prevent water from entering into the interior of the handset and shorting the telephone circuitry. In the preferred form, the fluid seal means comprises an annular elastomeric rib which peripherally surrounds the handset body. Preferably, the earpiece and mouthpiece also have water impermeable membranes to prevent water from passing through the earpiece and mouthpiece into the interior of the handset and shorting the telephone circuitry.

The back section of the handset can have at least one anti-slipping palm engaging member, segment or disc, to enhance gripping of the handset and prevent slippage of the handset in a shower. The front of the handset can also have a thumb-engaging depression to facilitate gripping of the handset in a shower.

In one form, the handset is only for receiving incoming calls which is activated by an on-off receive button. The handset can have an emergency button, e.g. a 911 button, to signal and transmit a message to an emergency operator if the user falls and hurts themself during a shower or if the user otherwise becomes seriously ill or partially incapacitated. The handset can operate on a single channel or multiple channels. The deluxe handset, can have: an alpha numeric keypad with pushbuttons for dialing outgoing telephone calls, a redial button, a hold button, a flash button, a conference call button, and/or a speakerphone, as well as a window or display for displaying the telephone number of an outgoing telephone call and/or identification (ID) of an incoming call.

The base unit or base of the shower telephone system is located away from the shower and bathtub, either in the bathroom or another room. The base unit has a battery charging chamber for recharging batteries or charging an extra pack of batteries for use in the cordless handset. The base unit can also have a battery charging indicator light or LED to indicate when the batteries are charging or have become fully charged. The base unit also has a base antenna which communicates with the antenna of the handset. The antennae can be foldable or retractable for ease of shipment and storage.

The base unit can have an interior compartment or chamber which houses telephone circuitry for transmitting and receiving telephone calls. The base unit can also have a separate set of alpha numeric keys to dial or transmit outgoing telephone calls from the base unit. The base unit can have an adapter plug and telephone cord which is hardwired and connected to the telephone line in the user's home, office, etc. The base unit can also have a power cord which is connected to the electrical lines in the user's home, office, etc. to power the battery charger in the base unit, LED display, etc.

The base unit can provide a cradle to store the handset, but need not do so since the handset can be powered by a separate battery pack. The handset can be hung on a hook, rack, bracket, or holder, mounted on a shower wall, towel rack or on the shower head pipe.

A more detailed explanation of the invention is provided in the following description and claims.

DETAILED DESCRIPTION OF THE PREFERRED EMBODIMENTS

Figure 1:
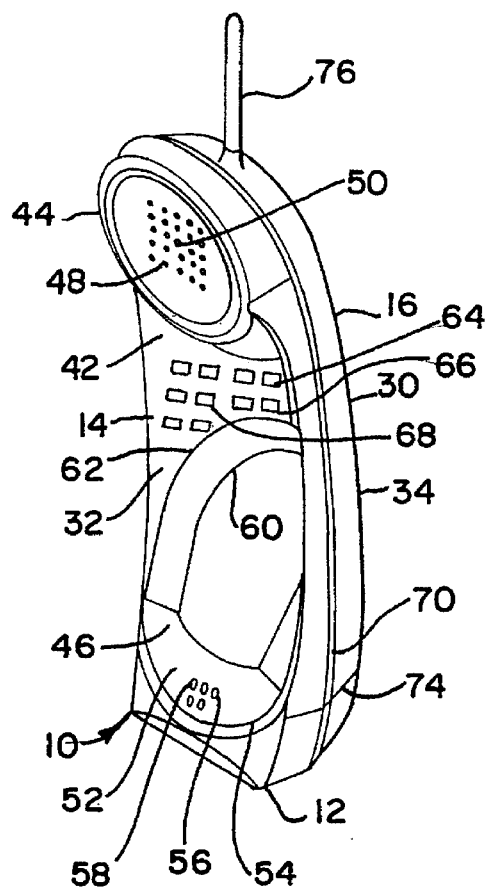
FIG. 1 is a front perspective view of a cordless handset of a shower telephone in accordance with principles of the present invention.
Figure 2:
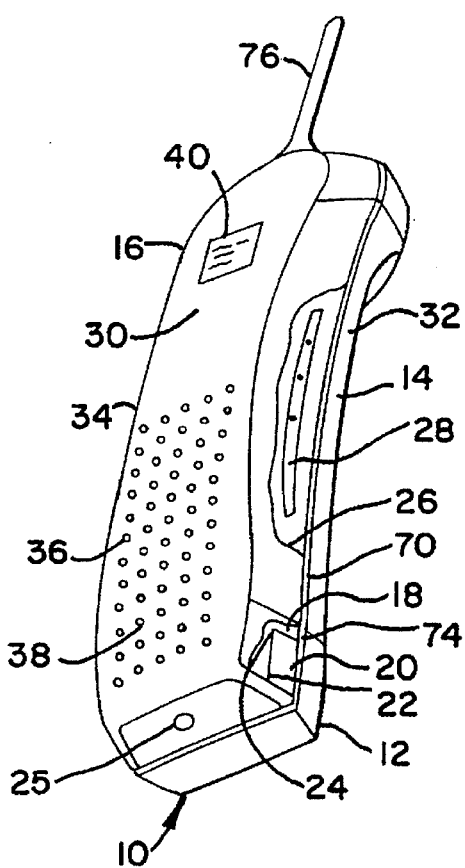
FIG. 2 is a right rear perspective view of the handset with portions broken away for ease of understanding and clarity.
Figure 3:
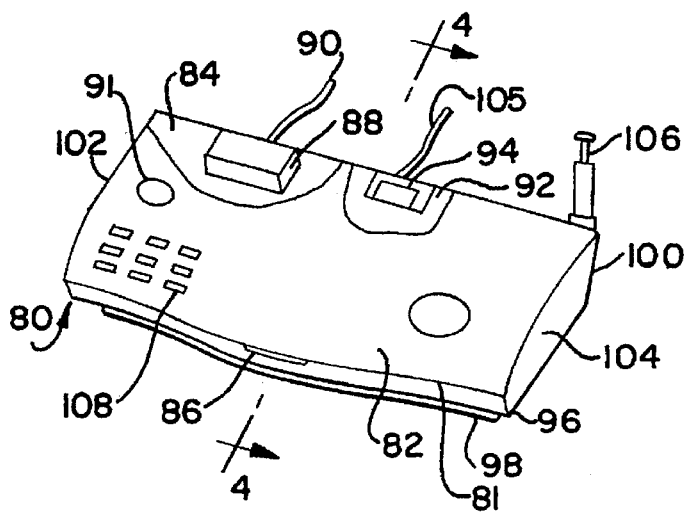
FIG. 3 is a front perspective view of the base unit with portions broken away for ease of understanding and clarity.
Figure 4:
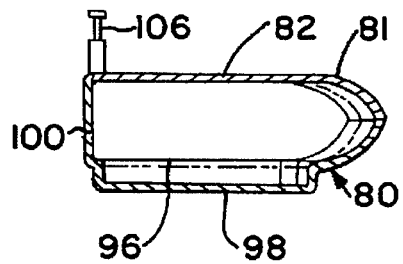
FIG. 4 is a cross sectional view of the base unit taken along line 4—4 of FIG. 5.

A shower telephone system 10 in FIGS. 1–4 comprises a shower telephone with a portable cordless handset 12 which can be safely, conveniently and comfortable used in a shower. While the water-resistant handset is particularly useful in a shower, it can also be safely used outside when it is drizzling, raining, or damp, or under high humidity conditions, or if the user's hand is wet such as when taking a bath or when washing dishes. The cordless telephone handset can comprise an analog handset, a digital handset, or a dual mode handset that has both an analog capacity and a digital capacity The telephone handset 12 comprises an impact-resistant plastic housing 14 or shell which provides a semi-rigid handset body 16 that can withstand water pressures from a shower ranging from 20–80 psi. The handset-housing 14 has an internal battery chamber or compartment 18 (FIG. 2) with a removable battery-access door 20 to receive a battery pack 22 comprising a set of batteries 24 to power the handset. The handset housing also has a low battery LED indicator 25. The housing further has an interior telephone circuitry-containing chamber, cavity or compartment 26 which houses and contains telephone circuitry 28 including a transmitting circuitry and receiving circuitry to power the portable cordless handset. The telephone circuitry can be mounted on a circuit board or comprise a microchip. The battery chamber can be spaced apart from the telephone circuitry-containing chamber.

The handset can comprise two or more separable parts separated by a parting line for access into the interior of the handset. The handset housing can include a back section 30 providing a back and a front section 32 providing a front. The back 30 of the handset has a convex surface 34 and shape. When in use, the back of the handset fits comfortably in the palm of the user's hand. The bottom portion of the back surface can have a matrix, array or aliquot spaced set of slip-resistant protuberances 36 which extend outwardly from the convex surface to facilitate gripping and help prevent the handset from slipping out of the user's hand during a shower. In the preferred embodiment, the protuberances include annular circular elastomeric anti-slip members comprising anti-slip discs 38. The discs are preferably of the same size. In some circumstances it may be desirably that discs are of different sizes of that the protuberances have a different shape. The upper portion of the back of the handset can have a rectangular handset-display window 40 to indicate and display the telephone number being called/dialed or the caller identification (ID) of an incoming call. The window can comprise a liquid crystal display (LCD) or light emitting diodes (LED). If desired, the window can be located on the front of the handset.

The front of the handset has a finger-gripable intermediate handle portion 42 which extends between and integrally connects the top earpiece 44 to the bottom mouthpiece 46. The handset can be 8 inches high×2.5 inches wide×2.5 inches deep and a weight of about 0.4 kg. Other size and weight handsets call be used.

The earpiece 44 can have a convex circular ear-engageable portion with earholes 48 to receive the senders's (caller's) voice from a receiving diaphragm 50 or other vibrating means which converts current and voltage in audible tones. The receiving diaphragm preferably comprises a water-impervious flexible earpiece membrane which prevents water from entering the earholes and shorting the internal telephone-receiving circuitry. The earpiece and receiving diaphragm are connected to the receiving-circuit within the interior of the handset to receive telephone signals from other telephones via the base unit and to unscramble and convert telephone signals into recognizable audible tones for the listener's ear.

The mouthpiece 46 can comprise an inclined, sloped, or concave recessed portion 52 with a semi-circular bottom edge 54 and a triangular set of mouthpiece holes 56 for transmission of the user's voice to a transmitting diaphragm 58 or other vibrating means which convert acoustical vibrations (words) into electrical impulses, i.e. voltage and current. If desired, the mouthpiece holes can be arranged in a different pattern. The receiving diaphragm preferably comprises a water-impervious flexible transmitting membrane which prevents water from entering the mouthpiece and shorting the internal telephone transmission circuitry. The mouthpiece and transmitting diaphragm can be connected to a transmitting-circuit within the interior of the handset to transmit telephone signals and to scramble and convert the user's voice/talking into telephone signals for transmission to the receiving telephone via the base unit.

The intermediate portion of the front of the handset has an arcuate curved depression 60 providing a thumb-receiving gripping portion to facilitate gripping of the handset in a shower. The curved depression has an upper curved edge 62 or arc which extends about 15–75 degrees, and preferably about 30–60 degrees.

The handset can have a receive on-off button 64 (on-off switch) and 911 emergency button 66 positioned above the curved edge 62. The emergency button when depressed or activated will transmit and connect with an emergency operator in case the user falls and hurts themself in a shower or is otherwise in need or emergency assistance. This is particularly useful for elderly persons.

The illustrative handset is operable on one channel but can also be used on multichannels. While the illustrative handset can receive only incoming calls, it can be equipped with finger-engageable, depressible, resilient keys 68 providing a handset key pad positioned above the curved edge 62 on the front of the handset. The keys can be rectangular or circular. The keys can include: alpha numeric buttons, a clear/stop/end button, a redial button, a hold button, and/or automatic dialing buttons for user-programmed stored telephone numbers.

An annular peripheral elastomeric rib 70 is positioned snugly between the front and back sections of the handset. The elastomeric rib peripherally and longitudinally surrounds the handset. The rib comprises an elastomer which is impervious to water, liquid, and solids to prevent water, soap, shampoo, hair conditioners and dirt from entering into the interior of the handset and shorting the handset telephone circuitry. The rib can be positioned in proximity to or include an elastomeric battery pack-seal 74 positioned about the handset-battery chamber compartment 18 and a battery-access door 20. The handset battery-seal comprises an elastomer which is impervious to water, liquid, and solids to prevent water, soap, shampoo, hair conditioners and dirt from entering into the interior of the battery chamber and shorting the batteries in the handset. The elastomeric rib and seal cooperates with the handset-housing to provide a protective shower-impervious assembly.

A handset telephone antenna 76 extends upwardly and outwardly from the handset and is connected to the handset telephone circuitry. The handset antenna is tuned to receive and transmit telephone signals. More specifically, the handset antenna of the cordless handset receives telephone signals from the antenna of the base unit along frequency modulated (FM) channels. The handset antenna can also transmits telephone signals along a frequency modulated band to the antenna of the base unit. The telephone antenna can be made of copper or other conductive metal. The handset antenna can comprise an: omnidirectional antenna, a telescoping antenna, a retractable antenna, a collapsible antenna, a foldable antenna, a pivotable antenna, or a flexible antenna, such as a flexible rubber antenna. Preferably, the antenna, is coated or encapsulated with a water-impermeable elastomer so as to have an exterior water-impervious surface.

The elastomeric rib, seal, discs, and coating for the handset antenna, can be made of rubber or rubber-like plastic, such as: neoprene, silicone, polyurethane, polychlorprene, nitrile rubber, butyl rubber, polysufide, cis-i, 4-polyisoprene, ethylene-propylene terpolymers (EPDM rubber).

Preferably, the earpiece membrane and mouthpiece membrane are made of polyester film, such as manufactured by E. I. DuPont de Nemours & Co. and sold under the trade name Mylar. In some circumstances, it may be desirable to use other materials for the earpiece membrane and mouthpiece membrane, such as: polyvinyl acetate, polyvinyl alcohol, polyvinyl buryral, polyvinyl chloride, cellulose acetate, cellulose acetate butryare, cellulose propionate, nylon, cellulose nitrate, ethyl cellulose, cellophane, fluorethenes, polyethylene, polyester, polystyrene, vinyl acetate, vinylidene chloride, polyamides, or methyl methacrylate.

The handset housing comprises a plastic which is impervious to water, liquid, and solids to prevent water, soap, shampoo, hair conditioners and dirt from entering into the interior of the handset and shorting the handset telephone circuitry and batteries. In the preferred embodiment, the handset housing comprising the handset body is made of acrylonitrile butadiene styrene (ABS). In come circumstances, it may be desirable that the handset housing comprising the handset body be made of other materials, such as: polyvinyl chloride (PVC), polyurethane, polyethylene, polyethylene oxide, polycarbonate, polyethylene, polypropylene, olefins (polyolefins), polyamides, nylon, polyamide-imides, polyimide sulfones, styrenes including styrene/acrylonitrile (SAN), styrene/butadiene (SB), styrene/maleic anyhydryde, vinyls including polyvinyl acetal, polyvinyl acetate (PVAC), polyvinyl alcohol (PVAL), polyvinyl butyryl (PVB), polyvinyl carbazole (PVK), polyvinylpyrrolidone (PVP), polyvinyl chloride acetate (PVCA), polyvinyl fluoride (PVF), polyvinylidene chloride PVDC), polyoxymethylene, ethylene/ethyl acrylate (EEA), acrylonitrile/styrene/acrylate (ASA), acetal (polyformaldehyde), acetate, ethylene/vinyl acetate (EVA), butyrate, acrylic (polymethyl methacrylate), acrylonitrile/methyl/methacrylate (AMMA), cellulosics including cellulose nitrate (CN), cellulose propionate (CP), ethyl cellulose (EC), cellulose acetate (CA), cellulose acetate butyrate (CAB), cellulose acetate propionate (CAP), cellulose formaldehyde (CF), cellulose triacetate (CTA), polyethylene terephthalate (PET), fluropolymers including chlorinated polyethylene (CPE), chlorinated polyvinyl chloride (CPVC), ionomers, polyarylate, polyarylterephthalate (PAT), polyarylether (PAE), polyarylamid (polyaramide), polyarylsulfone, polyphthalamide, polyarylsulfone, polybutylene, polyester, ethylene, polyuryletherketone, polymethylpentane, polyphenylene sulfide, polyphtralamide, or polysulfone, or combinations or blends of two or more of the preceding. The handset housing can also be coated or made with polytetrafluorethylene (PTFE) or other hydrophobic water-impermeable, liquid-impervious materials.

The shower telephone system has a base unit 80 (FIGS. 3 and 4) providing a base. The shower telephone base unit 80 has a base housing 81 with pivotable lid, door or top 82 for access into an interior battery-charging chamber or compartment 84. The lid can have a finger-gripable lip 86, handle, or latch to facilitate opening of the lid. The battery-charging chamber contains a battery charger 88 to recharge batteries from the battery pack in the handset or to charge an extra set of batteries for the cordless handset. The battery charger is connected to a power cord 90 with an outlet plug that plugs into the electrical socket of the user's house, office, etc. The base housing also has a battery charging LED indicator 91. The base housing can be made of the same plastic as the handset housing.

The base unit's housing also has an interior telephone circuitry-containing chamber or compartment 92 which houses and contains telephone circuitry 94 including a transmitting circuitry and receiving circuitry. The base unit's telephone circuitry can be mounted on a circuit board or comprise a microchip. The telephone circuitry-containing chamber can be spaced apart from the battery charging chamber. The bottom 96 of the housing of the base unit can be supported by a pedestal or stand 98. The back 100 or side 102 or 104 of the base housing can have a cord-receiving opening which provides a port or socket to receive a plug, adapter, and/or connector, attached to a telephone cord 105. The other end of the telephone cord has a base-engaging plug, adapter, and/or connector which matingly engages and fits into a port or socket of a telephone-line socket or jack to hardwire and connect the base unit to the telephone line of the user's home, office, etc. The base unit transmits and receives telephone signals to and from other telephones via the telephone line.

A base antenna 106 can extend upwardly from the top, back or sides of the base housing. The base antenna is tuned to receive and transmit telephone signals from the base unit to the cordless handset. More specifically, the base antenna transmit telephone signals it receives from other telephones to the handset antenna of the cordless handset along frequency modulated (FM) channels. The base antenna receives telephone signals along a frequency modulated band from the handset antenna of the cordless handset for transmission through the telephone line. The telephone antenna can be made of copper or other conductive metal. The base antenna can comprise an: omnidirectional antenna, a foldable antenna, a telescoping antenna, a retractable antenna, a collapsible antenna, a pivotable antenna, or a flexible antenna.

The telephone circuitry of the base unit provides a transceiver which comprises a control and logic unit. The transceiver can contain an amplifier, demodulator, and circuitry for tuning to telephone signals received by said base unit's telephone antenna, as well as carrier oscillators, amplifiers, and circuitry to transmit telephone signals through the base antenna to the cordless handset and through the telephone line to other telephones.

In some circumstances, it may be desirable that the base unit be equipped with finger-engageable, depressible, resilient base keys 108 providing a base key pad. The keys can be rectangular or circular. The keys can include: alpha numeric buttons, a clear/stop/end button, a redial button, a hold button, and/or automatic dialing buttons for user-programmed stored telephone numbers. The base unit can also have a speaker 110 mounted along the housing for handsfree telephone discussions.

In some circumstance, it may be desirable that the base unit comprise a cradle that is shaped complementary to the mouthpiece, bottom portion or front of the handset. The cradle can cradle, receive and support the handset vertically or horizontally when the handset is not being used.

Among the many advantages of the shower telephone system are: (1) outstanding performance in showers, rain, snow, moist and damp conditions, as well as in dry areas inside and outside of the home and office; (2) superb quality; (3) safe; (4) easy to use; (5) convenient; (6) comfortable; (7) attractive; (8) economical; (9) dependable; (10) efficient; and (11) effective.

Although embodiments of the invention have been shown and described, it is to be understood that various modifications and substitutions, as well as rearrangements of parts and components can be made by those skilled in the art without departing from the novel spirit and scope of this invention.

What is claimed is:

1. A telephone system, comprising:
a shower telephone comprising a handset for use in a shower, said handset comprising
a water-impervious shower-resistant housing providing a shower useable handset body of sufficient strength for withstanding water pressure from the shower, said handset body having a front section and a back section;
said shower-resistant housing comprising impact-resistant electrically insulating material;
said front section having a mouthpiece and an earpiece;
said housing defining a hollow interior compartment for housing receiving circuitry connected to said earpiece and transmitting circuitry connected to said mouthpiece;
said housing comprising a shower impermeable assembly providing a water-impervious barrier for preventing water from the shower from entering into said compartment and shorting said circuitry; and
said shower-impermeable assembly including a shampoo-resistant rib and a soap-resistant seal.

2. A telephone system in accordance with claim 1 wherein: said handset comprises a portable cordless handset for resisting water pressures ranging from about 20 pound per to square inch (psi) 80 pound per square inch (psi), said handset having a water-impervious antenna;
said housing has a battery chamber for receiving at least one battery for powering said handset; and
an indicator light for signaling when the power in the battery is low.

3. A telephone system in accordance with claim 1 including means for fluidly sealing said front and back sections; and
said back section has at least one anti-slipping palm-engaging member for enhancing gripping of the handset and preventing slippage of the handset in the shower.

4. A telephone system in accordance with claim 1 wherein:
said handset has an emergency button for transmitting a call to an emergency operator: and
said handset has a thumb-engaging depression for enhancing gripping of said handset in the shower.

5. A telephone system in accordance with claim 1 wherein said front section of said shower useable handset has a keypad comprising a set of alpha numeric buttons for transmitting telephone numbers.

6. A telephone system in accordance with claim 2 including a base located away from the shower, said base having a battery charging chamber for charging batteries for use in said shower useable handset, a base antenna for communicating with the water-impervious handset antenna, a telephone cord for connection to a phone line, and an interior chamber for containing telephone transmitting and receiving circuitry; and said base has a set of keys comprising alpha numeric pushbuttons for dialing telephone numbers.

7. A shower telephone system, comprising:

a shower-telephone comprising a shower useable portable cordless handset for use in a shower, comprising an impact-resistant soap-impervious plastic housing comprising a shower-resistant semi-rigid handset body for resisting water pressures from the shower ranging from about 20 pound per square inch (psi) to about 80 pound per square inch (psi), said housing defining an internal battery chamber for receiving a battery pack comprising a set of batteries to power the handset, and said housing defining an interior telephone circuitry-containing chamber for containing telephone circuitry including transmitting circuitry and receiving circuitry, and said housing having a front section and a back section;

an annular peripheral elastomeric shampoo-impervious rib positioned snugly between the front and back sections of the handset, said elastomeric shampoo-impervious rib peripherally and longitudinally surrounding the handset, said shampoo-impervious rib comprising an elastomer, said elastomer being impervious to water, liquid, and solids to prevent water, soap, shampoo, hair conditioner and dirt from entering into the telephone circuitry-containing chamber of the handset and shorting the telephone circuitry;

an elastomeric battery pack-seal comprising a hair conditioner-impervious barrier positioned about the battery chamber, said battery pack-seal being impervious to water, liquid, and solids for preventing water, soap, shampoo, hair conditioner and dirt from entering into the battery chamber and shorting the battery pack;

said housing having an activating switch comprising an on-off button connected to said telephone circuitry and having a battery indicating light comprising a light emitting diode, and said soap-impervious housing being impervious to water, liquid, and solids to prevent water, soap, shampoo, hair conditioner and dirt from entering into the telephone circuitry-containing chamber and battery chamber of the handset and shorting the telephone circuitry and battery pack;

said front section of the handset having an earpiece communicating with said receiving circuitry, a mouthpiece communicating with said transmitting circuitry, and an intermediate portion extending between and integrally connecting said earpiece and mouthpiece, said intermediate portion defining an arcuate depression to facilitate gripping of the handset in the shower, and said arcuate depression having an upper curved edge extending about 15–75 degrees;

said back section of the handset having a convex surface for fitting comfortably in the palm of a user's hand; and a shower useable handset antenna extending outwardly from said housing and connected to said telephone circuitry, said antenna having an exterior water-impervious surface.

8. A telephone system in accordance with claim 7 wherein:

said housing comprises a plastic selected from the group consisting of acrylonitrile butadiene styrene (ABS), polyvinyl chloride (PVC), polyurethane, polyethylene, polyethylene oxide, polycarbonate, polyethylene, polypropylene, olefins, polyolefins, polyamides, nylon, polyamide-imides, polyimide sulfones, styrenes including styrene/acrylonitrile (SAN), styrene/butadiene (SB), styrene/maleic anyhydryde, vinyls including polyvinyl acetal, polyvinyl acetate (PVAC), polyvinyl alcohol (PVAL), polyvinyl butyryl (PVB), polyvinyl carbazole (PVK), polyvinylpyrrolidone (PVP), polyvinyl chloride acetate (PVCA), polyvinyl fluoride (PVF), polyvinylidene chloride PVDC), polyoxymethylene, ethylene/ethyl acrylate (EEA), acrylonitrile/styrene/acrylate (ASA), acetal, polyformaldehyde, acetate, ethylene/vinyl acetate (EVA), butyrate, acrylic, polymethyl methacrylate, acrylonitrile/methyl/methacrylate (AMMA), cellulosics, cellulose nitrate (CN), cellulose propionate (CP), ethyl cellulose (EC), cellulose acetate (CA), cellulose acetate butyrate (CAB), cellulose acetate propionate (CAP), cellulose formaldehyde (CF), cellulose triacetate (CTA), polyethylene terephthalate (PET), fluropolymers, chlorinated polyethylene (CPE), chlorinated polyvinyl chloride (CPVC), ionomers, polyarylate, polyarylterephthalate (PAT), polyarylether (PAE), polyaryl amid, polyaramide, polyarylsulfone, polyphthalamide, polyarylsulfone, polybutylene, polyester, ethylene, polyuryletherketone, polymethylpentane, polyphenylene sulfide, polyphtralamide, polysulfone, and combinations thereof;

said elastomer in said rib is selected from the group consisting of neoprene, silicone, polyurethane, polychlorprene, nitrile rubber, butyl rubber, polysufide, cis-i, 4-polyisoprene, ethylene-propylene terpolymers, and natural rubber;

said battery-pack seal comprising an elastomeric seal selected from the group consisting of neoprene, silicone, polyurethane, polychlorprene, nitrile rubber, butyl rubber, polysufide, cis-i, 4-polyisoprene, ethylenepropylene terpolymers, and natural rubber;

said exterior water-impervious surface of said handset antenna comprises a material selected from the group consisting of neoprene, silicone, polyurethane, polychlorprene, nitrile rubber, butyl rubber, polysufide, cis-i, 4-polyisoprene, ethylene-propylene terpolymers, and natural rubber; and said handset antenna is selected from the group consisting of an omnidirectional antenna, a foldable antenna, a telescoping antenna, a retractable antenna, a collapsible antenna, a pivotable antenna, and a flexible antenna.

9. A telephone system in accordance with claim 7 including a base unit comprising:

a base housing defining a battery-charging chamber for containing a battery charger to recharge the batteries from the battery pack in the cordless handset or to charge an extra set of batteries for the cordless handset;

a power cord for connecting said battery charger to an electrical outlet;

said base housing having a battery charging indicator;

said base housing defining an interior base telephone circuitry-containing chamber for containing telephone circuitry including a transmitting circuitry and a receiving circuitry, said telephone circuitry-containing chamber of the base telephone being spaced from said battery-charging chamber;

a telephone cord for connecting said telephone circuitry in said base unit to a telephone line; and a base antenna extending upwardly from said base housing and operatively connected to said telephone circuitry in said base housing, said base antenna being selected from the group consisting of an omnidirectional antenna, a foldable antenna, a telescoping antenna, a retractable antenna, a collapsible antenna, a pivotable antenna, and a flexible antenna.

10. A telephone system in accordance with claim 7 wherein; said front section of said handset includes keys comprising alpha numeric pushbuttons for initiating an outgoing telephone call and an emergency button for signaling an emergency operator;

said back section of said handset comprises a matrix of slip-resistant protuberances extending outwardly from the convex surface for facilitating gripping of the back section of the handset to help prevent the handset from slipping out of the user's hand during a shower; and said protuberances comprise elastomeric anti-slip members selected from the group consisting of neoprene, silicone, polyurethane, polychlorprene, nitrile rubber, butyl rubber, polysufide, cis-I, 4-polyisoprene, ethylene-propylene terpolymers, and natural rubber.

\* \* \* \* \*